May 6, 1952     D. E. LOVELL     2,595,964
METHOD OF VULCANIZING SPONGE RUBBER
Filed July 8, 1949     2 SHEETS—SHEET 1
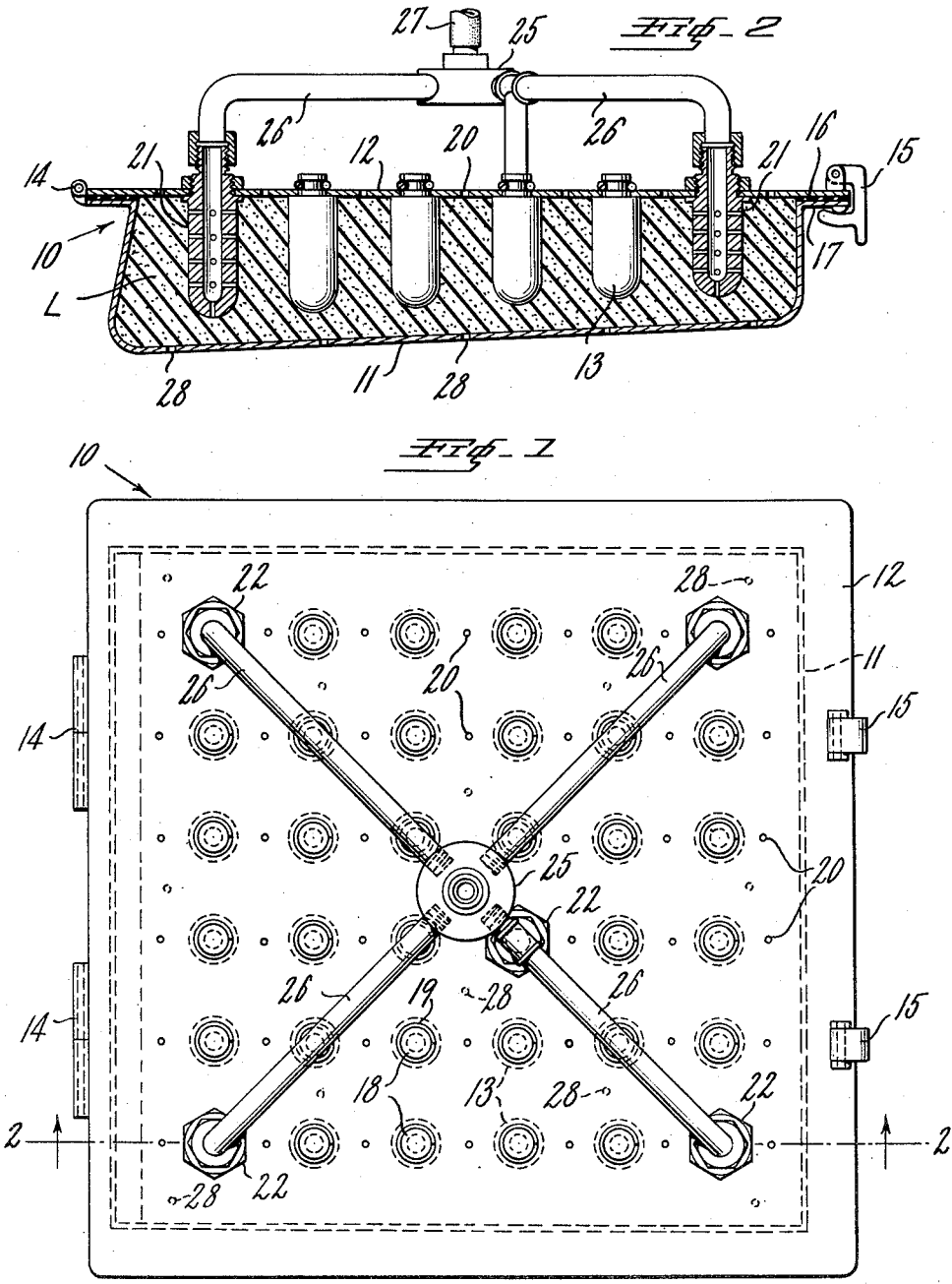
INVENTOR.
DALE E. LOVELL
BY
Charles C. Willson
ATTORNEY May 6, 1952 — D. E. LOVELL — 2,595,964
METHOD OF VULCANIZING SPONGE RUBBER
Filed July 8, 1949 — 2 SHEETS—SHEET 2
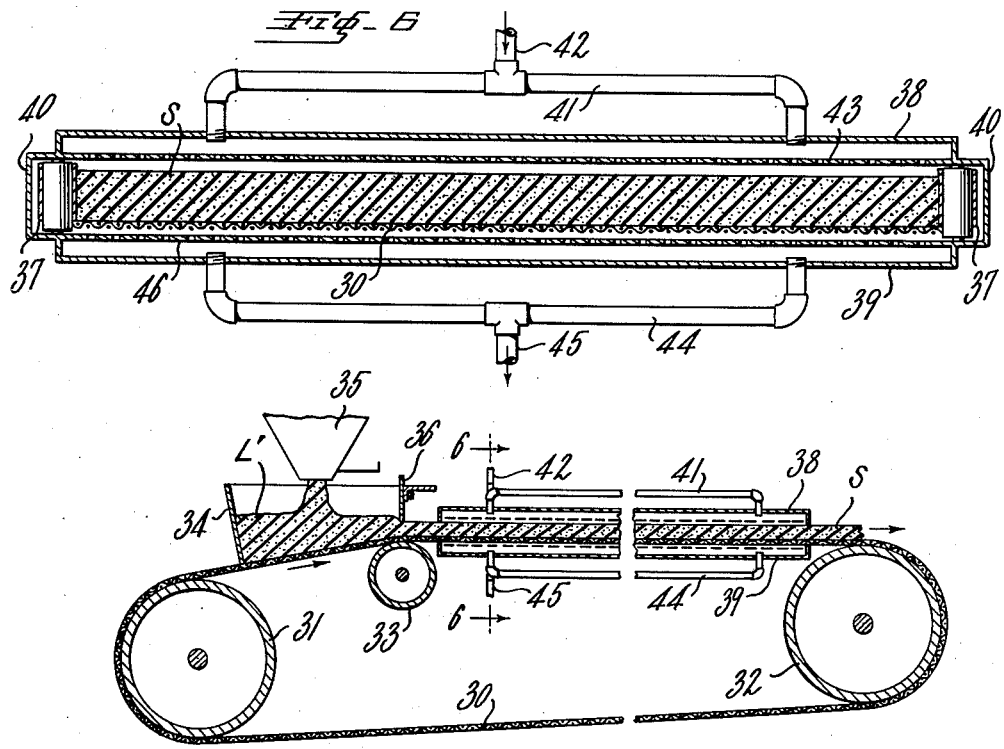
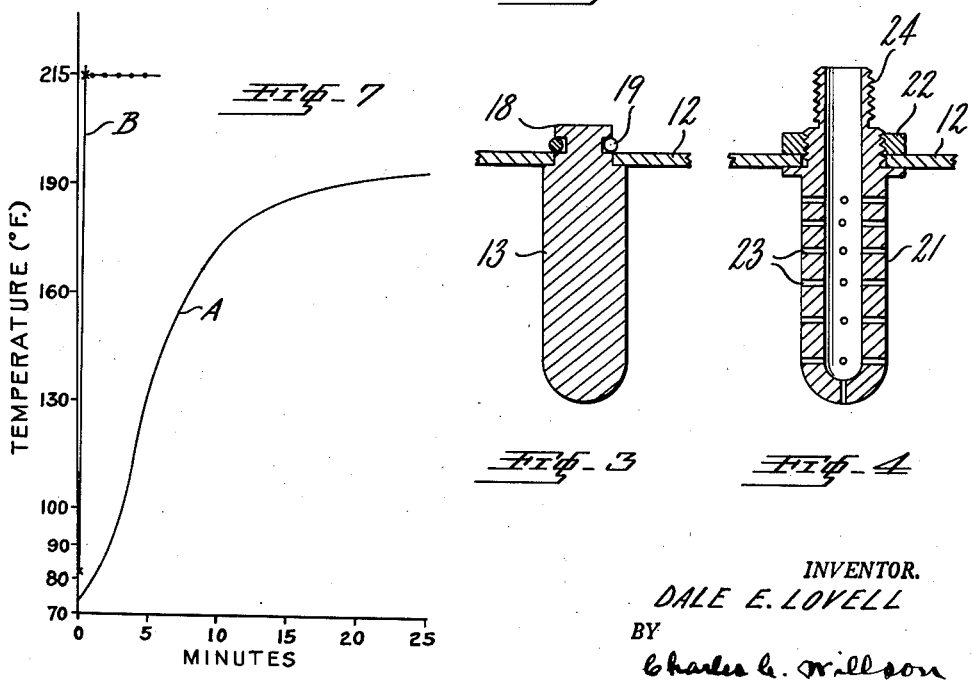
INVENTOR.
DALE E. LOVELL
BY Charles G. Willson
ATTORNEY Patented May 6, 1952

2,595,964

UNITED STATES PATENT OFFICE 2,595,964

METHOD OF VULCANIZING SPONGE RUBBER

Dale E. Lovell, Mishawaka, Ind., assignor to United States Rubber Company, New York, N. Y., a corporation of New Jersey Application July 8, 1949, Serial No. 103,545

8 Claims. (Cl. 18—53)

This invention relates to a method of vulcanizing sponge rubber having interconnecting cells, particularly sponge rubber made from frothed latex.

Sponge or foam rubber formed from latex is commonly made by blowing or whipping a latex composition into a froth, converting the froth into any desired shape as by pouring in molds or spreading on a traveling belt, setting the froth to an irreversible porous gel, and vulcanizing to form sponge rubber. This latter step is usually carried out by subjecting the foam rubber in a mold or on a traveling belt to the heating action of hot air or steam in a steam hood, or by placing the mold in an oven or pressure vulcanizer. Under such conditions the time required for vulcanizing sponge rubber cushions varies from 20 to 60 minutes, depending upon the size of the cushion and particularly its thickness. A large portion of this time may be required for the heat to penetrate into the central portion of the sponge mass.

More recently a rapid cure has been effected by subjecting sponge rubber to a high frequency field. This high frequency electrical cure is very fast due to the development of heat throughout the rubber mass, but it involves a large capital investment in high frequency generators and special dielectric molds, and creates a problem in fabricating molds of dielectric material.

The primary object of the present invention is to provide a simple, quick and inexpensive method for curing sponge rubber such as foamed or frothed latex having communicating cells. This is accomplished by introducing steam into the interior of the sponge mass, preferably at a number of points, so that the steam will pass quickly through all portions of the mass and then escape from the mass at a number of points, to thereby heat quickly the entire sponge mass and vulcanize it within a few minutes. As the steam enters the porous rubber mass it drives out the air and water from the condensed steam almost immediately, and as steam comes in direct contact with the cells throughout the sponge mass, the entire rubber mass is brought almost immediately to the vulcanizing temperature to effect a quick cure. The steam that is condensed within such cells gives up its latent heat to the cell walls, and this together with the rapid flow of steam serves to heat the entire cellular mass to a temperature of about 212° F. within a period of a few seconds.

Other objects of the invention are to provide a rapid mold turnover; to produce a sponge rubber product having improved physical characteristics; to effect economies in the amount of steam required for vulcanization; and to facilitate stripping the molded sponge rubber from the mold.

These and other objects of the invention will be further understood from the following description when read in connection with the accompanying drawings illustrating two types of apparatus for carrying out the present method.

In the drawings:

Fig. 1 is a top view of a mold adapted to cure sponge rubber in accordance with the present invention;

Fig. 2 is a vertical cross-section of the mold shown in Fig. 1 taken along the line 2—2;

Fig. 3 is a cross-sectional view of a conventional coring element attached to the mold top plate as shown in Fig. 2;

Fig. 4 is a cross-sectional view of one of the hollow coring elements shown in Fig. 2 as used to carry out the present invention;

Fig. 5 is a vertical sectional view through a continuous apparatus for curing foam rubber and has associated therewith apparatus for carrying out the present method;

Fig. 6 is a transverse sectional view of the apparatus shown in Fig. 5 taken along the line 6—6; and Fig. 7 is a time-temperature diagram to be described.

Broadly my invention consists in vulcanizing sponge rubber having interconnecting cells, by continuously forcing a hot fluid, preferably steam, through the cells of the sponge to heat and quickly vulcanize the rubber. Prior methods subjected the sponge rubber to a steam atmosphere wherein the steam merely impinged upon the outer surface of the rubber or upon the mold. Heat transfer by the means used heretofore to the interior of the rubber (excepting, of course, in the case of the high frequency cure) depended upon the conduction from the surface skin of the rubber through the cell walls and upon convection of air among the cells. Both conduction and convection are very slow methods of transferring heat through sponge rubber.

By forcing steam continuously through the sponge rubber and its communicating cells, in accordance with my method, all the cells are kept filled with fresh steam at curing temperature. Air and condensed steam within the cells are constantly being replaced by fresh steam at the vulcanizing temperature. The thin walls between the cells are vulcanized very quickly under such conditions since there is practically no time lapse from the moment the steam is introduced until the time it reaches the interior of the uncured sponge rubber piece, so that all portions of the sponge rubber are subjected to the same temperature for the same length of time.

I have found also that the short steam cure employed in the practice of my invention is responsible for improving the physical properties of the vulcanized sponge rubber over those of the same rubber compounds cured according to conventional methods. These prior methods have the bad effect of oxidizing the rubber as well as the desired effect of chemically combining sulfur. This oxidation or aging, with accompanying reduction in quality, is reduced to a minimum when steam is injected into the pores of the rubber according to the present method and a uniform cure throughout the sponge mass is secured.

In carrying out the present invention foam rubber is preferably formed by foaming or frothing latex, then a sensitizing agent is added and the foam is poured into a mold or onto a supporting belt where it sets quick, say in about five minutes. It is then subjected to the steam heating treatment of the present invention which cures the sponge mass in from about five to ten minutes.

Referring to the drawings and particularly Figs. 1 and 2, the mold 10 is for the most part, of the conventional type used for molding sponge rubber cushions. It consists of a bottom pan portion 11 and a top plate 12 from which coring elements 13 project into the mold. The mold is preferably made from aluminium and the cores may also be made of aluminum or other suitable material. The top plate 12 is shown as secured to the bottom pan portion 11 by the hinges 14, and this top plate may have the latches 15 for holding the top plate latched in its closed position. A gasket 16 is preferably provided upon the outwardly flaring portion 17 of the pan 11 as shown, to thereby provide a tight joint between the pan and top plate. However other means may be provided for operatively associating the top plate 12 with a bottom pan portion 11.

The cores 13 may be secured to the top plate 12 as best shown in Fig. 3, wherein it will be seen that each core 13 is reduced somewhat in diameter near its upper end as at 18, so that it may be inserted in a hole formed in the top plate 12, and it is secured in this position by a split ring 19 which may be sprung around the reduced neck portion 18 of the core to lie partly within an annular recess formed about such core, to thereby lock the core to the top plate in a well known manner. The top plate 12 is provided with a series of small vent holes 20 through which air may escape as the mold is filled with the foamed or frothed rubber.

After the mold 10 has been filled with the frothed latex L and the top plate 12 has been secured in the closed position as shown in Fig. 2, the foamed or frothed latex L will set quickly, due to the presence of a sensitizing agent, to form a porous gelled mass whereupon the same is ready to be vulcanized. This is accomplished in accordance with the present invention by introducing live steam into such cellular mass, preferably at a number of points, so that the steam will pass through all portions of the cellular mass to drive out the air and heat the cells to the vulcanizing temperature.

The mold 10, as so far described by reference numerals, is or may be of conventional construction. This mold can be easily modified to supply vulcanizing steam to the interior of the latex mass L, by providing such mold with steam supply pipes projecting into the interior of the mold. This is preferably accomplished by introducing the vulcanizing steam into the foam mass L through certain of the inwardly projecting cores above mentioned. To this end, in the construction shown five of the usual cores 13 have been removed and replaced by the hollow cores 21. These cores, as best shown in Fig. 4, have a threaded portion near the upper end to receive a clamping nut 22 adapted to clamp such core in place after its threaded portion just mentioned has been inserted through a hole in the top plate 12. This core 21 is made hollow as shown and is provided with a number of small discharged apertures 23 through which steam supplied to the core may escape through these apertures into the foamed mass. The upper end of the core 21 is threaded as at 24 so that a steam supply pipe may be secured thereto.

Steam is supplied to these hollow cores 21, in the construction shown, by providing above the mold 10 a manifold comprising the head 25 having extending therefrom the steam pipes 26 that are secured to the hollow cores disposed near the four corners of the mold, and one of these pipes 26 is also connected to a hollow core 21 located almost immediately below the head 25. Steam is supplied to the head 25 through any suitable connection, such for example, as a flexible steam hose 27 which due to its flexibility need not be disconnected when the top plate 12 is swung to its open position to empty the mold.

The lower wall of the bottom pan portion 11 is preferably provided with a number of small apertures 28. The construction is such that when it is desired to vulcanize the porous sponge mass L, when the parts are in the position shown in Fig. 2, all that is necessary is to supply the head 25 with steam at a slight pressure, say about ½ lb. per square inch, so that this steam will enter the various hollow cores 21 and escape therefrom through the apertures 23 into the sponge mass to penetrate through such mass. The effect of this will be first to drive out any air within the mass and the moisture resulting from condensed steam or otherwise. Such air and water will escape through the vents 20 and 28. The steam will heat the entire interior of the sponge mass almost immediately to approximately 200° F. to thereby start vulcanizing the latex mass. As a result of the present method whereby steam is caused to circulate through all portions of the sponge mass the entire mass is raised almost immediately to vulcanizing temperatures, and within less than one minute from the time the stream is first supplied to the manifold head 25 all portions of the sponge mass will be raised to the vulcanizing temperature, whereupon if desired the steam pressure may be increased slightly, say up to one pound per square inch, to speed up the cure. It is found in practice that by employing the method of the present invention the complete cure for a molded sponge mass such as shown in Figs. 1 and 2 of the drawing and which may be five or six inches thick can be effected in less than ten minutes.

Although the seal around the gasket 16 need not be 100% water tight, an excessive amount of steam should not be permitted to escape from between the top plate 12 and flange 17 of the pan, as this would unnecessarily waste steam. The maximum steam pressure used should not be much over one pound per square inch since more pressure than this tends to deform the sponge rubber around the cores through which the steam is admitted. After the rubber mass has been subjected to the steam pressure of about ½ pound per square inch for about 30 seconds it will be cured sufficiently so that a slightly higher pressure can be used without misshaping the foamed mass. As the steam expands through the cellular net work within the foamed rubber, its temperature may drop from about 250° F. to about 215° F. This lower temperature is high enough to cure the rubber very quickly since the heat is conducted only through the very thin walls of the cells, and at this temperature sufficient vulcanization can be secured within a few minutes.

In order to compare the quick curing method of the present invention with a much slower method commonly used heretofore in which heat applied to the exterior of the mold slowly penetrated through the sponge mass, the following test was conducted. A mold like that illustrated in Figs. 1 and 2 of the drawings and having the dimensions of 12" x 12" x 3" was filled with foam latex compound, permitted to set or gel, and subjected to an external steam cure in a steam hood in accordance with the conventional curing procedure. At regular intervals temperature readings were taken inside of the foam rubber to check the rate of temperature rise. The temperature of the steam inside the hood was maintained at 198° F. The internal temperature rose gradually from 76° to 190° F. in 15 minutes. During the next 10 minutes, required to complete the cure, the temperature rose very slowly to a maximum of 195° F. This rate of cure is indicated on the time-temperature diagram of Fig. 7, wherein the result of such test is indicated by the curve A. For purposes of comparison the same mold was filled with some of the same batch of foam rubber composition and permitted to gel. After gelling the pores break down and become interconnected. Steam was then injected into the head 25 and through the hollow cores 21 into the latex foam L according to the practice of the present invention. The curve B of the diagram of Fig. 7 graphically illustrates how quickly the temperature within the foam rubber rose under these conditions. Within 30 seconds the temperature had risen to 215° F. and within 5 minutes the complete cure had been effected.

Physical and chemical tests were conducted on the two foam rubber cushions produced by the two different vulcanizing operations just described. It was found that the loss of compression after flexing 250,000 cycles was 25% for the conventionally cured cushion as compared with 16% for the cushion cured according to the present invention. Likewise, the permanent set was markedly less, being only 11% as compared to 40% for the cushion cured according to the conventional method. Chemical tests indicate that the steam injection method of cure, contemplated by the present invention, was responsible for a better cure, more sulphur having been combined with the rubber. In addition to the advantages and physical characteristics just mentioned, it was found by employing the method of the present invention only one pound of steam was required to cure one pound of sponge rubber, whereas if a steam hood such as used heretofore is employed, 15 pounds of steam is normally required to cure one pound of sponge rubber. Furthermore the curing apparatus employed to practice the present method is very simple and requires neither vulcanizer, oven or hood.

Another noteworthy advantage secured by the present method resides in the fact that the mold turnover is increased by at least 200%, over the prior practice to give a number of cushions, therefore, only ⅓ of the number of molds is required for the same output, as compared with the number required heretofore when steam or hot air applied to the exterior of the foam mass was used. It has also been determined that sponge cushions which have been saturated with steam in accordance with the present invention can be removed from the mold much more easily than those which are dry cured, as the moisture tends to free the rubber from the mold parts.

All sponge rubber made from foamed or frothed latex is not made in a mold. For example the Blair et al. Patent 2,441,235 shows, describes and claims apparatus for making such sponge rubber in the form of a continuous sheet, by depositing the frothed and sensitized rubber latex upon an endless conveyor belt, and then conveying it through a long heating chamber where it is vulcanized. Such sheet may have a thickness of from 1 to 2 inches and may be nearly 2 yards wide. The time to vulcanize such a continuous moving sheet may take from 20 to 30 minutes for any one area. The reason for this comparatively long cure is due to the fact that the steam supplied to the long vulcanizing chamber merely impinges upon the surface of the rubber sponge, and considerable time is consumed before the interior of the foamed rubber is raised to the curing temperature.

To vulcanize sheet stock continuously in accordance with the present method, the apparatus illustrated in Figs. 5 and 6 of the drawings may be used. The sensitized frothed latex indicated by L' in Fig. 5 may be deposited on a stainless steel endless screen or apron 30. This screen passes around the end rolls 31 and 32 rotatably mounted at a substantial distance from each other, and one or both of these rolls may be driven to advance this endless screen in the direction indicated by the arrow. The upper run of this screen passes from the drum 31 in an upwardly inclined direction over the idler or supporting roll 33, and above this portion of the screen is formed an enclosure or box 34 adapted to receive the foamed latex from a receptacle 35. The foamed latex thus deposited in the box 34 upon the upper run of the screen 30 will be advanced by this screen in the direction the screen travels, and it is leveled off on the screen by the gate 36 which is adjustable to control the thickness of the foamed latex sheet S thus formed. The deckle or side belts 37 support the side edges of the sheet S until it has set.

The mechanism of Figs. 5 and 6 so far described is rather similar to that disclosed in the Blair et al. patent above mentioned, but instead of employing the very long heating and vulcanizing chamber of said patent, it is proposed to use a much shorter and less expensive vulcanizing chamber. This is accomplished by so constructing such chamber that the steam used to supply the vulcanizing heat will be passed entirely through the sheet S, instead of surrounding and impinging against the outer face of such sheet as heretofore.

In order to employ the method of the present invention to cure a continuously moving latex sponge sheet S such as shown in Figs. 5 and 6, it is desirable to provide directly above such sheet the steam confining housing 38, and directly below such sheet beneath the upper run of the screen 30, the similar steam confining housing 39. These two housings are connected at each side of the sheet S just beyond the deckle belts 37 by the walls 40, to thereby reduce the loss of steam. Steam is supplied to the upper chamber 38 by the manifold 41 which is connected to the source of steam supply 42, and this manifold preferably consists of a number of pipes leading to various portions of the chamber 38. The lower portion of the chamber 38 is preferably provided with a wall 43 having formed therein a large number of apertures so that the steam may escape from the chamber 38 through these apertures to the upper face of the rubber sheet S. The lower chamber 39 is preferably provided with a similar manifold 44 which is connected to a pipe 45 that may lead to vacuum means. The chamber 39 like the upper chamber has a perforated wall 46. The arrangement is such that steam is supplied at a slight pressure above the moving sheet S by the chamber 38, and its passage through the sheet S is facilitated by producing a slight suction in the chamber 39 by connecting this chamber with the vacuum pipe 45. All water condensation and displaced air removed from the sheet S are carried off by the suction means just described.

The illustrations herein shown and described are not intended to limit the invention, since it is apparent that those skilled in the art will be able to devise other forms of apparatus for carrying out the method of the present invention, whereby the time required to vulcanize a molded mass of frothed latex rubber can be reduced to a few minutes by causing steam to flow through all portions of the porous sponge rubber to thereby quickly heat and vulcanize the rubber mass.

Having thus described my invention what I claim and desire to protect by Letters Patent is:

1. The method of vulcanizing frothed latex rubber having air cells into a predetermined shape, which comprises confining the frothed rubber mass sufficiently to give it the desired molded shape, permitting the mass to set to a porous cellular condition, then introducing steam into the interior of the set open cell mass so that it will pass rapidly through the pores towards the outer walls of the mass, to thereby heat quickly the entire frothed mass and vulcanize it.

2. The method of vulcanizing frothed latex rubber having air cells into a predetermined shape, which comprises confining the frothed rubber mass sufficiently to give it the desired molded shape, permitting the mass to set to a porous cellular condition, then introducing steam into the interior of the set open cell mass at a number of points so that it will pass rapidly through the pores towards the outer wall of the mass, to thereby heat quickly the entire mass and vulcanize the same.

3. The method of vulcanizing frothed latex rubber having air cells into a predetermined shape, which comprises confining the frothed rubber mass sufficiently to give it the desired molded shape, permitting the mass to set to a porous cellular condition, then introducing steam into the interior of the set open cell mass at a number of points so that it will pass rapidly through the pores throughout the mass, to thereby heat quickly the entire mass and vulcanize the same within a period of not over ten minutes of the steam treatment.

4. The method of vulcanizing frothed latex rubber having air cells into a predetermined shape, which comprises confining the frothed rubber mass sufficiently to give it the desired molded shape, permitting the mass to set to a porous cellular condition, then introducing steam at slightly above atmospheric pressure into the interior of the set open cell mass to force out the air and heat quickly the mass, and after the air is driven out and the mass is hot increasing the steam pressure slightly to vulcanize the mass quickly.

5. The method of vulcanizing frothed latex rubber having air cells, which comprises introducing frothed latex into a mold adapted to be closed, allowing it to set in the closed mold to a porous mass, then introducing steam into the interior of the porous mass at a number of points to pass quickly through the pores of the rubber mass to displace the air and heat the mass quickly, to thereby vulcanize the molded latex mass.

6. The method of vulcanizing frothed latex rubber, which comprises introducing frothed latex into a mold adapted to be closed and having perforated core forming elements that project into the interior of the mold, allowing the foam latex to set to a porous mass in the closed mold, then introducing steam into a plurality of the core forming elements to pass from such elements into the interior of the porous mass to circulate through the pores and heat the molded latex mass quickly, to thereby vulcanize the molded latex mass.

7. The method of vulcanizing frothed latex rubber having air cells into a predetermined shape, which comprises confining the frothed rubber mass sufficiently to give it the desired molded shape, permitting the mass to set to a porous cellular condition, then introducing steam into the interior of the set mass at a number of points so that it will pass from said points outwardly quickly through the pores of the froth, to thereby heat quickly and uniformly the frothed mass to vulcanize the same.

8. The method of vulcanizing frothed latex rubber having air cells to form a molded cellular mass, which comprises confining the frothed latex rubber mass sufficiently to give it the desired molded shape, permitting the mass to set to a porous cellular condition, then introducing steam into the interior of the set open cell mass so that it will pass rapidly through the pores thereof, to thereby heat the interior of the cellular mass as quickly as the exterior thereof and vulcanize the entire mass.

DALE E. LOVELL.

REFERENCES CITED

The following references are of record in the file of this patent:

UNITED STATES PATENTS

| Number | Name | Date |
|---|---|---|
| 1,908,682 | Bronson | May 16, 1933 |
| 2,150,287 | Minor | Mar. 14, 1939 |
| 2,161,308 | Murphy | June 6, 1939 |
| 2,325,903 | Blair | Aug. 3, 1943 |
| 2,351,529 | Luxenberger | June 13, 1944 |